United States Patent
Kuo et al.

(10) Patent No.: US 6,603,478 B1
(45) Date of Patent: Aug. 5, 2003

(54) SYSTEM, METHOD AND A COMPUTER READABLE MEDIUM FOR IMPROVING CHARACTER ACCESS

(75) Inventors: Chia Sheng Kuo, Taipe (TW); Kuo Young Cheng, Taichung Hsieng (TW)

(73) Assignee: Dynalab, Inc., Taipei (TW)

( * ) Notice: Subject to any disclaimer, the term of this patent is extended or adjusted under 35 U.S.C. 154(b) by 0 days.

(21) Appl. No.: 09/556,611

(22) Filed: Apr. 21, 2000

(51) Int. Cl.[7] .................................................. G09G 5/22
(52) U.S. Cl. ...................... 345/467; 345/471; 345/472.3
(58) Field of Search ................................. 345/467, 469, 345/471, 472.3; 358/1.15

(56) References Cited

U.S. PATENT DOCUMENTS 5,533,174 A * 7/1996 Flowers, Jr. ............... 358/1.15
5,852,448 A * 12/1998 Cheng ........................ 345/469

* cited by examiner

*Primary Examiner*—Matthew Luu
(74) *Attorney, Agent, or Firm*—Rosenberg, Klein & Lee

(57) ABSTRACT

A system, method and a computer readable medium for controlling character data access between a personal computer and server. This system allows a user to display large amounts of data required to accurately represent, store, manipulate and create characters of an Asian font. The system includes one or more personal computers and a server coupled to a public data network. The one or more personal computers and the server interact to provide the users of the one or more personal computers with access to Asian characters stored on both the personal computer and the server.

24 Claims, 7 Drawing Sheets

SYSTEM, METHOD AND A COMPUTER READABLE MEDIUM FOR IMPROVING CHARACTER ACCESS

FIELD OF THE INVENTION

This invention relates to the art of Asian character processing and more particularly, method and system for improving Asian character access on a personal computer.

BACKGROUND OF THE INVENTION

There is a demand in the Asian font market that all characters of a font be readily accessed, displayed, stored and printed by an end user of a personal computer more efficiently.

Each Asian font is a collection of characters, representing words or concepts that include brush strokes and glyphs designed in a particular style. The written representations of each character must be unique so the reader accurately understands the concept communicated. An entire set of Asian characters in a particular font requires a large amount of disk storage space since a single Asian font, unlike roman-based languages, may contain more than 13,000 characters. Thus, because of storage limitations on a typical stand-alone computer system, an entire font is not accessible by a user.

Since, most stand-alone computers do not have sufficient storage space to store all Asian characters of a particular font, only a portion of the Asian font data (i.e. Asian characters) is stored and the remaining portion of the Asian font data must be stored on an alternative or auxiliary storage device. Therefore, the user cannot easily access all the Asian font data. What is needed is a system and method for allowing users of a personal computer to have unlimited access to the all characters of an Asian font.

The present invention is directed to overcoming the foregoing and other disadvantages. More specifically, the present invention is directed to providing a system, method, and a computer readable medium for improving Asian character access on a personal computer.

SUMMARY OF THE INVENTION

In accordance with this invention, a system, method, and a computer readable medium for improving Asian character access on a personal computer are provided. The present invention allows a user to display the large amount of data required to accurately represent, store, manipulate, print and create characters of an Asian language.

The system includes one or more personal computers and a server coupled to a public data network. The one or more personal computers include a processing device, memory, a display and a character selection device comprising inputs associated with components of Asian characters. User activation of the inputs generates a code. The server includes a processor that is coupled a database. The personal computer compares the generated code to a standard set of codes associated with Asian characters stored in the memory of the personal computer. If the Asian characters associated with the generated code are included in the standard set of codes, the associated Asian characters are displayed on the display. If a user desired character is one of the displayed associated Asian characters, the user selects the desired Asian character using the character selection device. If a user desired character is not one of the displayed associated Asian characters, the personal computer sends a character request message across the public data network to the server. The character request message inlcudes the generated code. Then, the server retrieves one or more characters from a database coupled to the server according to the generated code and sends the retrieved one or more characters to the personal computer for display.

If the Asian characters associated with the generated code are determined not to be stored on the personal computer, the personal computer sends a character request message across the public data network to the server, the character request message comprises the generated code. Then, the server retrieves one or more characters from the database coupled to the server according to the generated code, and sends the retrieved one or more characters to the personal computer for display.

In accordance with another aspect of the present invention, the retrieval of character information is repeated, if the characters sent and displayed to the user are not desired by the user.

In accordance with still another aspect of the present invention, the retrieval of character information retrieves a portion of characters associated with the generated code from the database. The portion is approximately 20% of the characters associated with the code stored in the database.

In accordance with still yet another aspect of the present invention, the location of a character stored in the database that is selected by the user has its storage location adjusted within the database. The adjusting rule is an 80/20 rule.

As will be readily appreciated from the foregoing summary, the invention provides a new and improved method, system and computer program product for allowing users of a personal computer to have unlimited access to all characters of an Asian font.

BRIEF DESCRIPTION OF THE DRAWINGS

The foregoing aspects and many of the attendant advantages of this invention will become more readily appreciated as the same becomes better understood by reference to the following detailed descriptions, when taken in conjunction with the accompanying drawings, wherein.

DETAILED DESCRIPTION OF THE PREFERRED EMBODIMENT

Figure 1A:
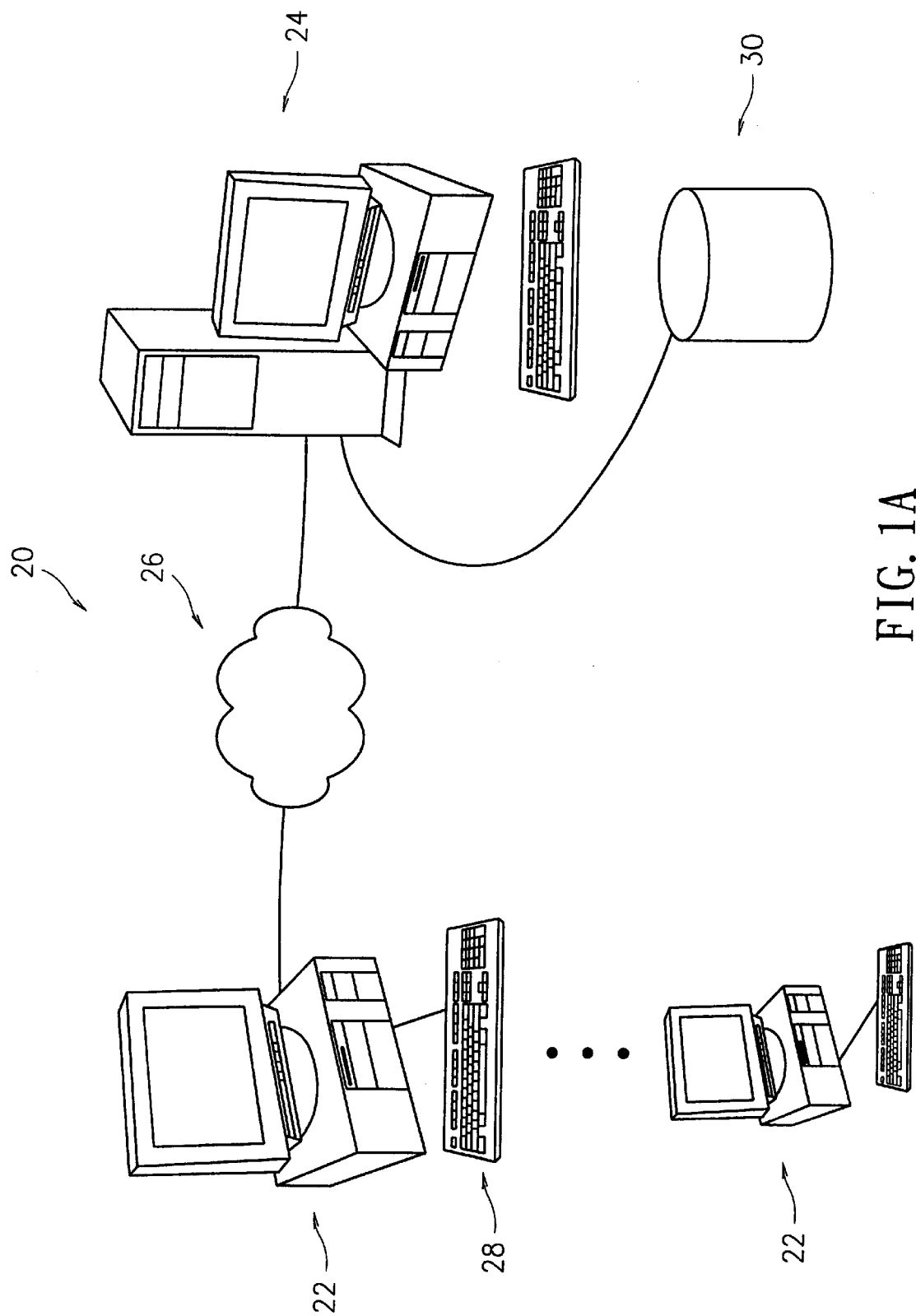
FIGS. 1A and B illustrate a system formed in accordance with the present invention.

The present invention is a system and method for controlling access and storage of Asian character data. An exemplary system 20 is illustrated in FIGS. 1A and B. The system 20 includes at least one personal computer 22 coupled to a server 24 across a public or private data network 26. The personal computer 22 includes a display and at least one user interface device 28 for allowing user interaction. The personal computer 22 and the server 24 include at least one processor, memory and data transmission and reception devices. A structured character database 30 is coupled to the server 24 for storing characters not stored in the memory of the personal computer 22.

Figure 1B:
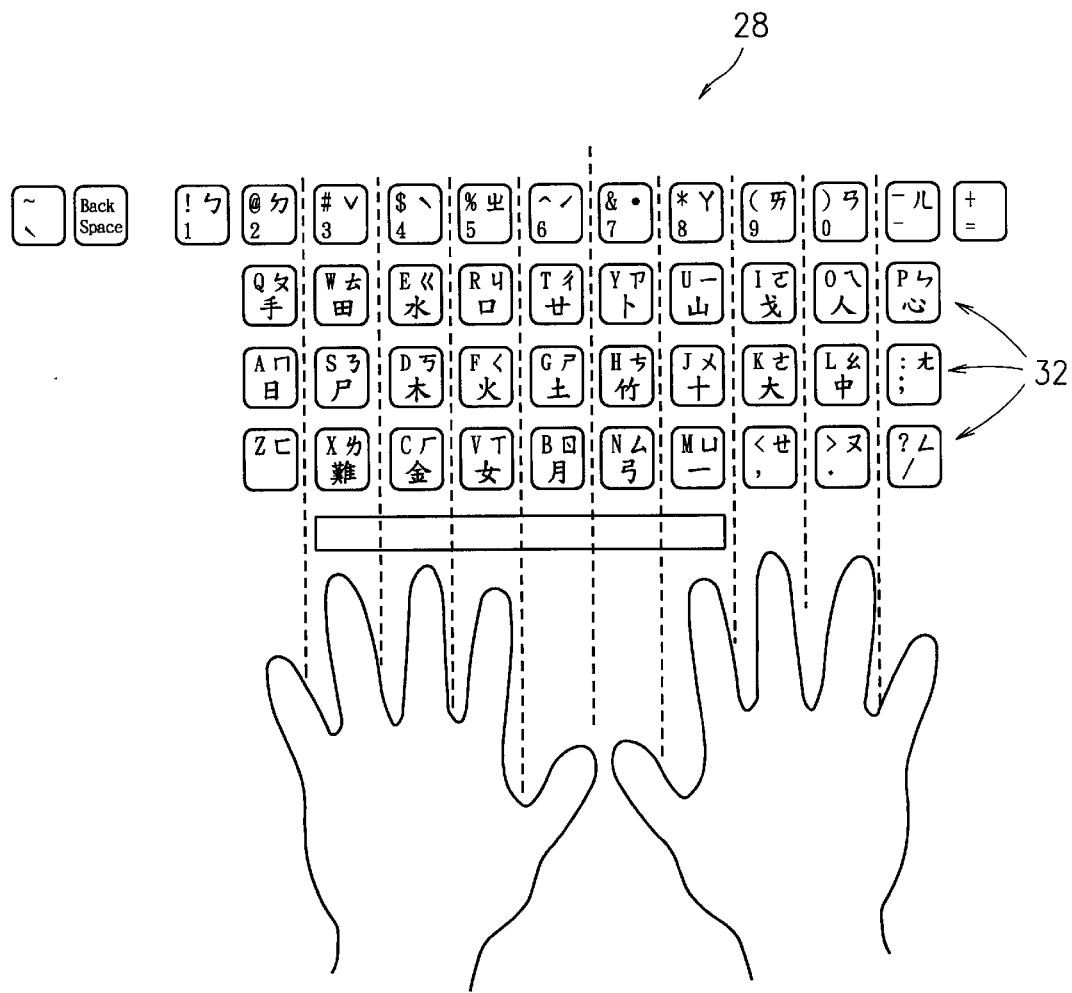
Figure 2:
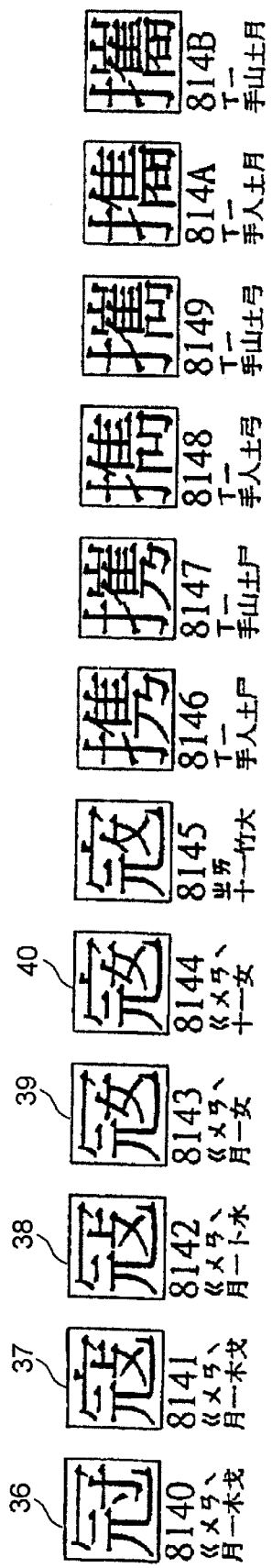
FIG. 2 illustrates a small set of characters with their associated codes and key entries.

FIG. 1B illustrates an example user interface device 28. In this example the user interface device 28 is a QUERTY keyboard where each key represents at least one group of similar strokes or glyphs used to create Chinese characters. A stroke is considered a single movement and a glyph is considered to comprise two or more strokes. When the personal computer 22 is executing Chinese text entry software application, each sequence of selected keyboard keys associated with a stroke or glyph generates a code, preferably an alpha-numeric code. If the user desires to select a character 36 as shown in FIG. 2, the user selects the following keys (sequence of key selection may be important depending upon the particular constructs of the software program): E, J, 0, 4. The present invention retrieves the characters 36-40 from either the personal computer 22 or the server 24 according to the code generated based on the selected keys. Then, the user selects character 36 from the retrieved characters. This process is described below in more detail in FIGS. 3–7. As can be readily appreciated by those of ordinary skill in the art of Asian character keyboards, the keyboard keys may be designated with any combination of Asian character stroke or glyphs provided the character processing software is coordinated with the particular keyboard layout.

Because each character occupies a significant amount of memory space and a particular font includes well over 13,000 characters, an entire font is too large to be stored exclusively within the memory of the personal computer 22. Therefore, the present invention divides the characters into three distinct groups of character types. The first group of Asian characters has standard character codes and reside in the memory of the personal computer 22. The first group of characters is referred to as standard characters and their respective codes are standard character codes. The second group of characters also has standard character codes and reside within the structured character database 30 coupled to the server 24. The second group of characters is referred as type 1 characters and their respective codes are standard character codes are type 1 codes. The third group of characters has non-standard character codes and also reside within the structured character database 30 coupled to the server 24. The third group of characters is referred to as type 2 characters and their respective codes are standard character codes are type 2 codes. FIGS. 3–7 illustrate the process performed by the present inventions for providing each personal computer user with unlimited character access. Table 1 below shows the Asian character types and their storage locations as defined by the present invention:

TABLE 1

| | Character Groups | |
|---|---|---|
| Character type | Character Codes C(x) | Location |
| Standard Character | Standard | Personal Computer |
| Type 1 Character | Standard | Structured Database |
| Type 2 Character | Non-Standard | Structured Database |

Figure 3:
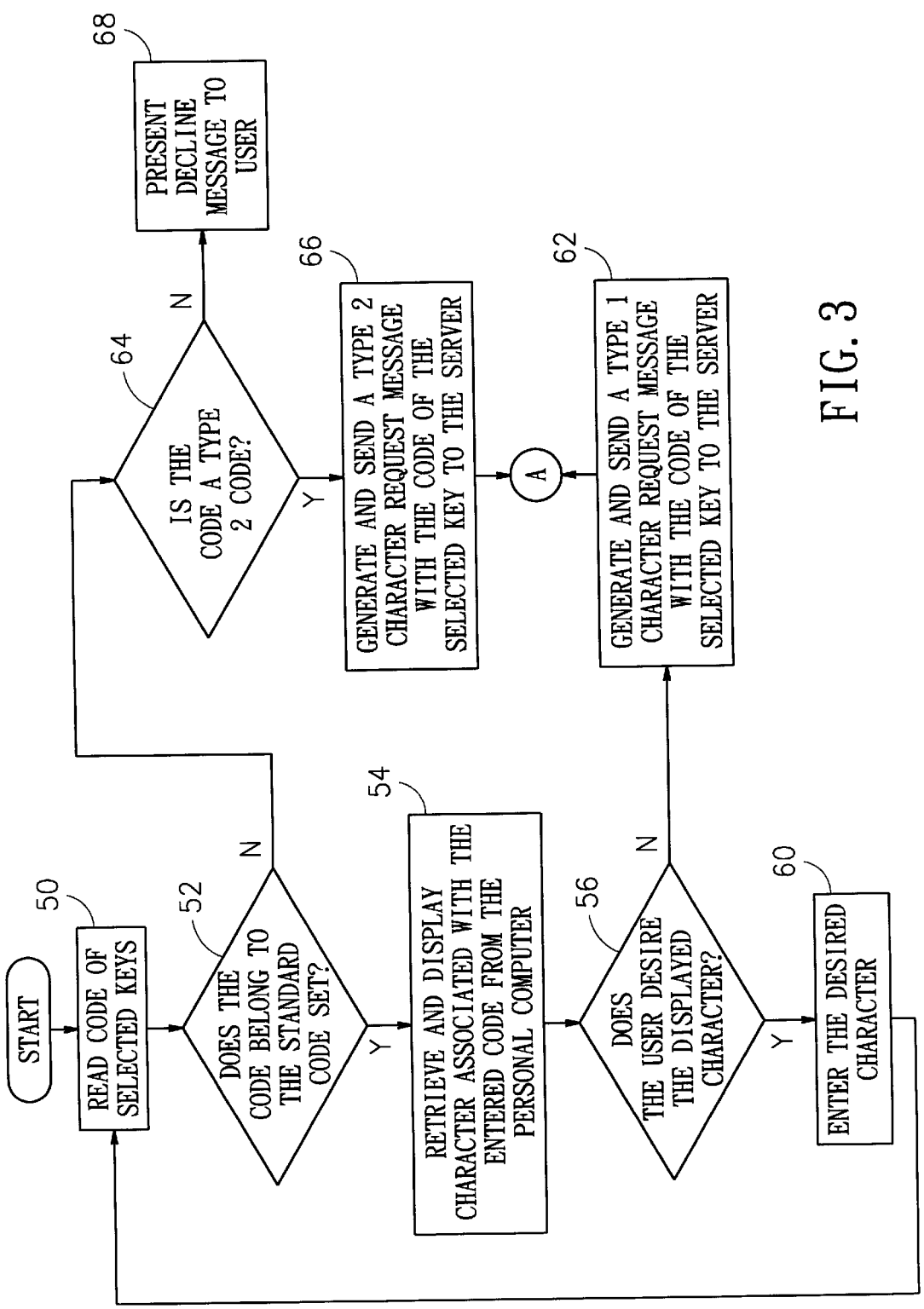
FIGS. 3–5 illustrate the process steps of the present invention as performed by the system of FIG. 1.
Figure 4:
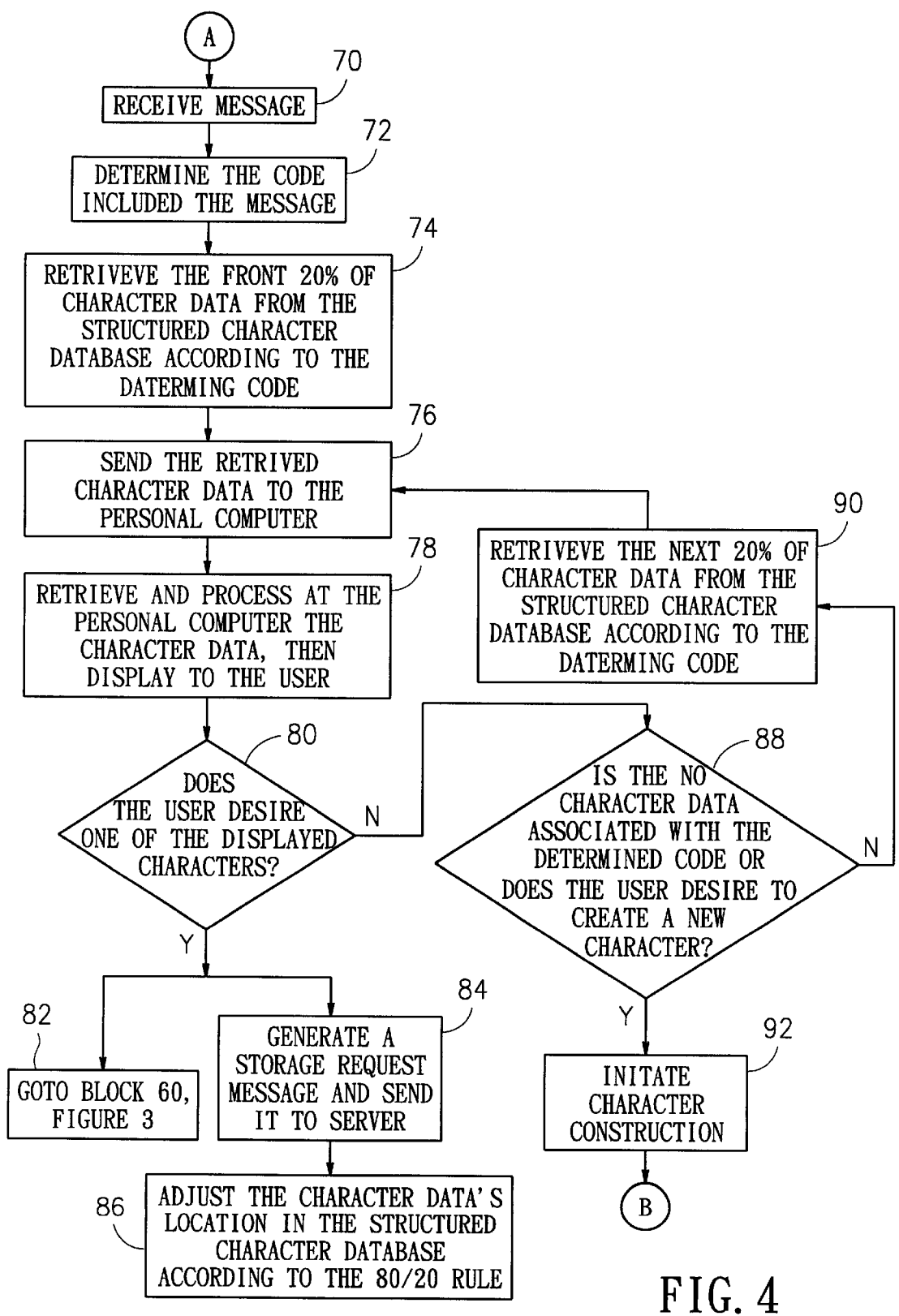
Figure 5:
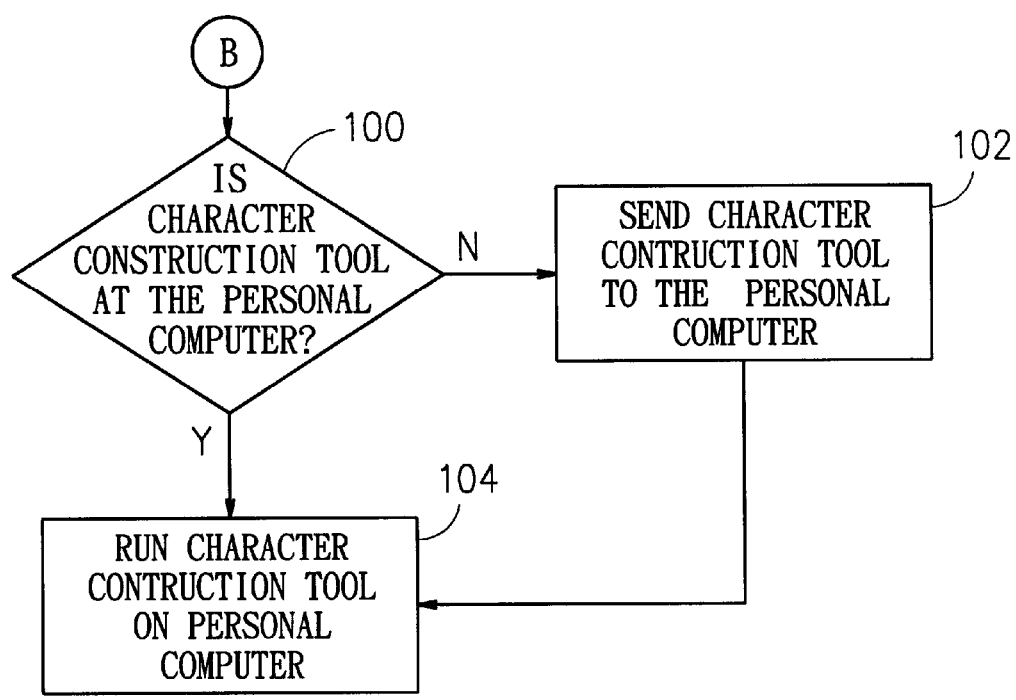

As can be readily appreciated by those of ordinary skill in the art of Asian character processing, the characters that are included in each of the character groups are predetermined according to future personal computer and character processing software limitations. FIGS. 3–5 show an exemplary method to control the access and display of all the types of Asian characters of a font using the system of FIG. 1. A user begins by manipulating the user interface 28 of the personal computer 22 to open a character processing software application that allows the user to enter and display Asian characters, such as Chinese or Japanese characters.

As shown in FIG. 3, the user of the personal computer 22 activates keyboard keys that include the strokes or glyphs associated with a character the user desires to display. At block 50, the character processing application determines the character code associated with the activated keys. The character code or C(x) is tested against the standard character codes residing on the personal computer 22, see decision block 52. If one or more characters are stored on the personal computer 52, those locally stored characters are retrieved and displayed, see block 54. Then, at decision block 56, the user determines if the character they desire is amongst those displayed. If one of the displayed characters is the desired character, at block 60, the user selects that character for entry, whereby the character processing application returns to block 50 to interpret the users next set of activated keys. If none of the displayed characters are the desired character, the desired character is a type 1 character and, at block 62, a type 1 character request message including the read code is automatically generated and sent to the server 24 (see FIG. 4).

If the read code does not match the standard codes, at decision block 52, the processing application determines if the code matches any type 2 codes, see decision block 64. If the read code does match a type 2 code, a request message for a type 2 character including the read code is automatically generated and sent to server 24, see block 66 and FIG. 4. However, if the read code does not match any type 2 code, a decline message is presented to the user indicating that no characters are associated with the entered key sequence, see block 68. In a second embodiment, if the read code does not match the standard codes, at decision block 52, the process automatically generates a decline message for the user to view, block 66.

Referring to FIG. 4, the server 24 now has two critical pieces of information needed to retrieve character data from the structured character database 28, the character code and the character type. At block 70, the server 24 receives across the network the message generated at the personal computer 22, blocks 62 and 66 of FIG. 3. Next, at block 72, the server 24 running an access program determines the code and the character type included in the message. The server 24 then accesses the structured character database 30 according to the determined code and type and retrieves the associated character data, see block 74. The retrieved character data is then formatted into a display packet and delivered to the personal computer 22 over the network 26, see block 76.

In the second embodiment, decision block 64 is performed after block 72. If it is determined, at decision block 64, that the code is a type 2 code, the process proceeds to block 74. Otherwise, the code is not a type 1 or type 2, thereby initiating a decline message that is sent to the personal computer 22, see block 68.

In order for a user to have the feeling that all character data is stored locally on the personal computer 22, the retrieval and delivery of characters from the server 24 to the personal computer 22 must be expedited to near real-time. Various database retrieval methods may be employed to accomplish this. For example, as shown at block 74, the top 20% of character data stored in the structured character database 30 that are associated with determined code and type are retrieved and sent. In this example, the character data is stored in the structured character database 30 in a linked-list where the character data at the top of the list for each character type and code are more frequently used in the language. Thus, it is more likely that the first delivery of character data to the personal computer 22 will include the character that the user desires. As can be readily appreciated by those of ordinary skill in the art of database management, various other known techniques may be employed for efficiently access the database.

At block 78, the personal computer 22 receives from the server 24 across the network 26 the sent character data. The personal computer 22 then processes the character data to generate characters for display. A system and method for efficiently delivering and processing character data is described in U.S. Pat. No. 5,852,448. In '448 the receiving and sending computers include software components for processing the character data.

Next, at decision block 80, the user determines if the character they desire is one of those displayed. If a character is desired, the user selects the desired character, block 82, whereby the process returns to block 60 of FIG. 3, and the personal computer 22 generates a storage request message and sends the storage request message to the server 24, block 84. When the server 24 receives the storage request message, the server 24 adjusts the character data's location in the structured database to reflect the user's desire to use it. An example technique for altering a character data's location is the 80/20 rule which essentially states that the information associated with characters that are used 80% of the time should be located in the top 20% of the database. In other words, the present invention prestores character data according to an analysis of what characters associated with a particular code are used more often than others. Since this prestored analysis may not be entirely accurate, the present invention adjusts the order of character data in the database according to what users are selecting. Other storage adjusting techniques may be applied.

If at decision block 88, none of the displayed characters are desired, the server 24 retrieves more character data from the structured character database 30, block 90, if it is determined, at decision block 88, that more character data associated with the determined code exists and the user does not desire to use a construction tool to create a new character. If no more character data that is associated with the determined code exists or the user desires to use a construction tool to create a new character, character construction is initiated, block 92, see FIG. 5.

FIG. 5 illustrates the process of initiating a character construction tool. First, at decision block 100, the processing application determines if the character construction tool is located at the personal computer 22. If the character construction tool is located at the personal computer 22, it is executed, thereby allowing the user to create a desired character, block 104. If the character construction tool is not located at the personal computer 22, it is retrieved from its location and send via the network 26 to the personal computer 22, block 102. An example of a character construction tool is a graphics program that allows a user to graphically edit existing characters (standard, type 1 or type 2 characters) to appear as desired. As can be readily appreciated by those of ordinary skill in network data communication, the components of the present invention may be distributed across the network 28.

Figure 6:
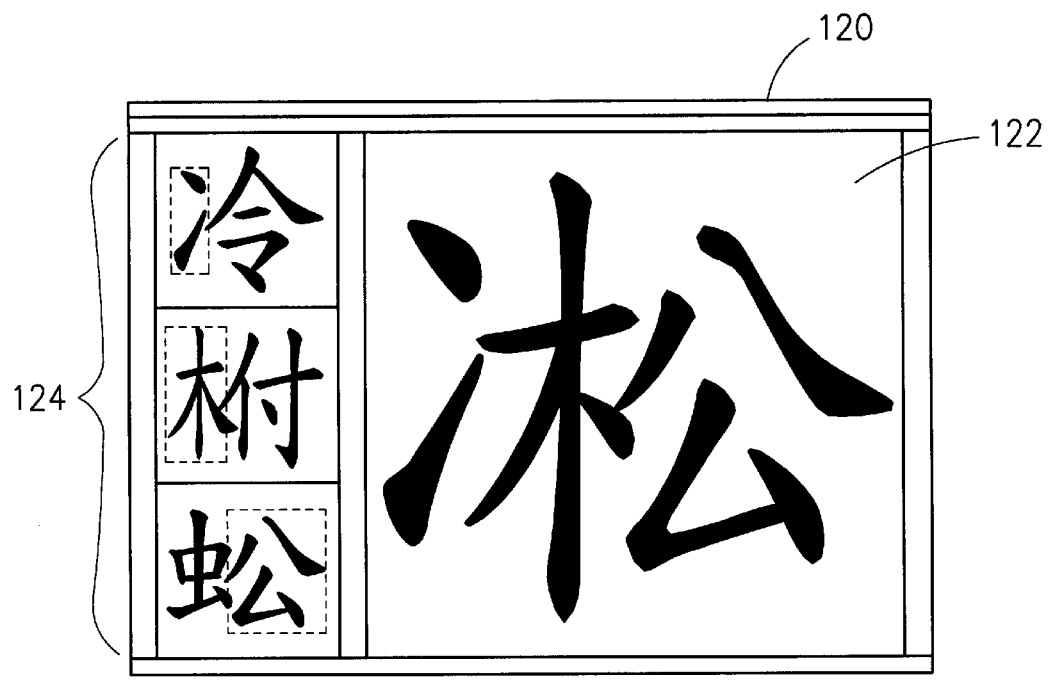
FIGS. 6 and 7 illustrate an example character construction tool.
Figure 7:
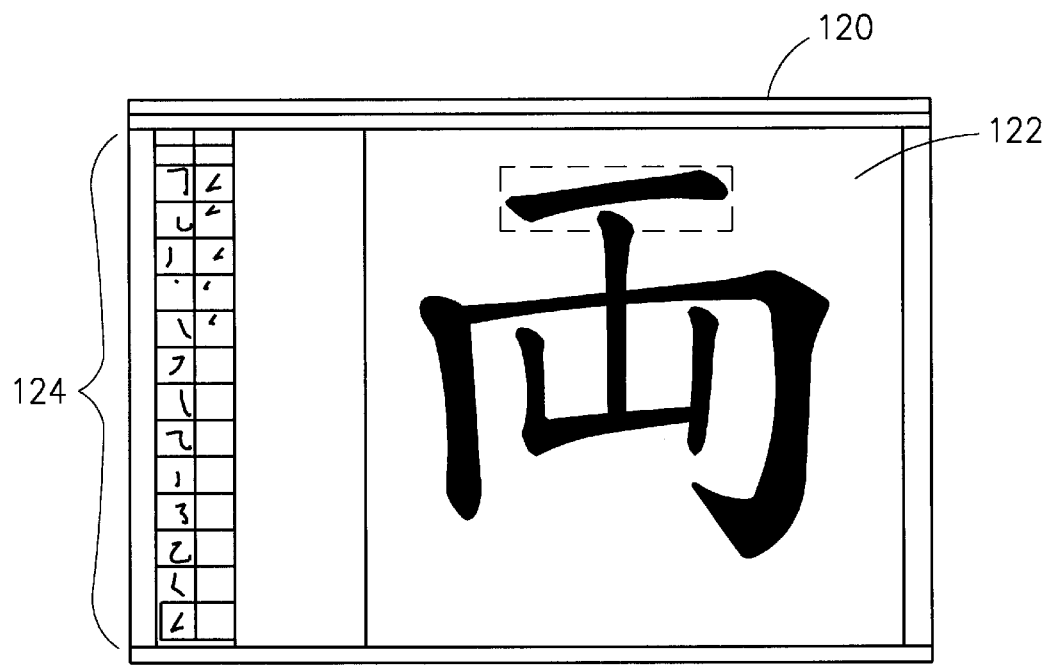

FIGS. 6 and 7 are screen shots of an example character construction tool. In FIG. 6 a construction window 120 includes a workspace 122 and a retrieval section 124. In the retrieval section 124 the user selects previously stored characters for display. The user can highlight or select strokes or glyphs from one or more of the displayed previously stored characters then drag and drop them onto the workspace 122. In FIG. 7 the construction window 120 includes a graphical list of basic strokes or glyphs in the retrieval section 124. The user can also drag and drop a basic stroke or glyph onto the workspace 122. The strokes and glyphs can be positioned anywhere within the workspace 122 and their size and shape can also be altered by the user.

While the preferred embodiment of the invention has been illustrated and described, it will be appreciated that various changes can be made without departing from the spirit and scope of the invention. The embodiments of the invention in which an exclusive property or privilege is claimed are defined as follows:

1. A method for displaying characters of an Asian font, said method comprising:
 a) generating a code based on user activation of a character input device coupled to a personal computer;
 b) determining where all Asian characters associated with said generated code are stored;
 c) if said Asian characters associated with said generated code are determined to be stored on a personal computer associated with said user,
  i) displaying the associated Asian characters;
  ii) if a user desired character is one of the displayed associated Asian characters, selecting the desired Asian character,
  iii) if a user desired character is not one of the displayed associated Asian characters,
   1) sending a character request message across a public data network to a server, said character request message comprises the generated code;
   2) retrieving one or more characters from a database coupled to the server according to the generated code;
   3) sending said retrieved one or more characters to said personal computer; and
   4) displaying the sent one or more characters for the user to select; and
 d) if said Asian characters associated with said generated code are determined not to be stored on the personal computer,
  i) sending a character request message across the public data network to the server, said character request message comprises the generated code;
  ii) retrieving one or more characters from a database coupled to the server according to the generated code;
  iii) sending said retrieved one or more characters to said personal computer; and
  iv) displaying the sent one or more characters for the user to select.

2. The method of claim 1, wherein if the user desired character is not included in the displayed characters of c.iii.4., repeating c.iii. 1–4.

3. The method of claim 2, wherein if the user desired character is not included in the displayed characters of d.iv., repeating d.i–iv.

4. The method of claim 3, wherein c.iii.2. and d.ii. retrieve a portion of characters from the database.

5. The method of claim 4, wherein the portion is approximately 20% of the characters associated with the code.

6. The method of claim 1, further comprising after c.iii.4. and d.iii. if the user desired character is displayed,
 selecting the desired character;
 sending a storage message to the server, said storage message identifies the selected character; and
 adjusting the identified character's location in the database.

7. The method of claim 6, wherein adjusting further comprises adjusting the identified character's location in the database according to an adjusting rule.

8. The method of claim 7, wherein the adjusting rule is the 80/20 rule.

9. A system for displaying characters of an Asian font using a public data network, said system comprising:
one or more personal computers coupled to said public data network, said one or more personal computers comprising:
a processing device;
memory;
a display; and
a character selection device comprising inputs associated with components of Asian characters, wherein user activation of said inputs generates a code;
a server comprising a processor, wherein said server coupled to said public data network; and
a database coupled to said server;
wherein each personal computer comprises a first component for comparing said generated code to a standard set of codes associated with Asian characters stored in the memory of the personal computer,
if, as determined by said first component, said Asian characters associated with said generated code are included in said standard set of codes, the associated Asian characters are displayed on the display;
a) if a user desired character is one of the displayed associated Asian characters, the user selects the desired Asian character using the character selection device,
b) if a user desired character is not one of the displayed associated Asian characters,
i) said personal computer sends a character request message across said public data network to said server, said character request message comprises the generated code;
ii) said server retrieves one or more characters from a database coupled to the server according to the generated code and sends said retrieved one or more characters to said personal computer; and
iii) said personal computer displays the sent one or more characters for the user to select; and
c) if said Asian characters associated with said generated code are determined not to be stored on the personal computer,
i) said personal computer sends a character request message across the public data. network to the server, said character request message comprises the generated code;
ii) said server retrieves one or more characters from a database coupled to the server according to the generated code, and sends said retrieved one or more characters to said personal computer; and
iii) said personal computer displays the sent one or more characters for the user to select, 10. The system of claim 9, wherein if the user desired character is not included in the displayed characters of c.iii., repeating c.i.–iii.

11. The system of claim 10, wherein if the user desired character is not included in the displayed characters of b.iii., repeating b.i.–ii.

12. The system of claim 11, wherein c.ii. and d.ii. retrieve a portion of characters associated with the generated code from the database.

13. The system of claim 12, wherein the portion is approximately 20% of the characters associated with the code stored in the database.

14. The system of claim 9, wherein after c.iii. and b.iii., if the user desired character is displayed,
the personal computer receives a selection of the desired character upon user activation of the character selection device and sends a storage message to the server, wherein said storage message identifies the selected character; and
the server adjusts the identified character's location in the database.

15. The system of claim 14, wherein server adjusts the identified character's location in the database according to an adjusting rule.

16. The system of claim 15, wherein the adjusting rule is an 80/20 rule.

17. A computer readable medium for performing the method of claim 1.

18. A computer readable medium for performing the method of claim 2.

19. A computer readable medium for performing the method of claim 3.

20. A computer readable medium for performing the method of claim 4.

21. A computer readable medium for performing the method of claim 5.

22. A computer readable medium for performing the method of claim 6.

23. A computer readable medium for performing the method of claim 7.

24. A computer readable medium for performing the method of claim 8.

* * * * *